United States Patent
Sanford et al.

(10) Patent No.: US 10,703,231 B1
(45) Date of Patent: Jul. 7, 2020

(54) JUVENILE VEHICLE SEAT WITH MOVABLE HEADREST

(71) Applicant: Dorel Juvenile Group, Inc., Foxboro, MA (US)

(72) Inventors: Jennifer L. Sanford, Attleboro, MA (US); Kurt Nygren, Harvard, MA (US); Gordon Woods, Nauvoo, AL (US)

(73) Assignee: Dorel Juvenile Group, Inc., Foxboro, MA (US)

( * ) Notice: Subject to any disclaimer, the term of this patent is extended or adjusted under 35 U.S.C. 154(b) by 0 days.

(21) Appl. No.: 16/255,353

(22) Filed: Jan. 23, 2019

(51) Int. Cl.
*B60N 2/809* (2018.01)
*B60N 2/28* (2006.01)
*B60N 2/829* (2018.01)

(52) U.S. Cl.
CPC .......... *B60N 2/2851* (2013.01); *B60N 2/809* (2018.02); *B60N 2/829* (2018.02)

(58) Field of Classification Search
CPC .............................. B60N 2/809; B60N 2/2851
See application file for complete search history.

(56) References Cited

U.S. PATENT DOCUMENTS

| | | | |
|---|---|---|---|
| 5,845,968 A | 12/1998 | Lovie | |
| 6,135,553 A | 10/2000 | Lovie et al. | |
| 6,908,151 B2 | 6/2005 | Meeker et al. | |
| 7,032,969 B1 | 4/2006 | Campbell | |
| 7,438,358 B2 | 10/2008 | Jane Santamaria | |
| 7,452,031 B2 | 11/2008 | Woellert et al. | |
| 7,954,895 B2 | 6/2011 | Freeman et al. | |
| 8,282,165 B2 | 10/2012 | Kespohl | |
| 8,342,604 B2 * | 1/2013 | Heisey | B60N 2/2812 297/250.1 |
| 9,067,516 B2 | 6/2015 | Hutchinson et al. | |
| 9,415,707 B2 | 8/2016 | Bohm | |
| 2005/0242642 A1 * | 11/2005 | Kespohl | B60N 2/2872 297/256.1 |
| 2017/0106772 A1 * | 4/2017 | Williams | B60N 2/2812 |
| 2019/0176662 A1 * | 6/2019 | Pleiman | B60N 2/2806 |
| 2019/0344694 A1 * | 11/2019 | Johnson | B60N 2/2851 |

FOREIGN PATENT DOCUMENTS

CA    2576234 A1 *   2/2006   ........... B60N 2/2812

* cited by examiner

*Primary Examiner* — Timothy J Brindley
(74) *Attorney, Agent, or Firm* — Barnes & Thornburg LLP

(57) ABSTRACT

A child restraint includes a seat bottom and a seat back. The seat back includes a backrest and a headrest that is mounted for up-and-down movement on the backrest toward and away from the seat bottom.

25 Claims, 12 Drawing Sheets

JUVENILE VEHICLE SEAT WITH MOVABLE HEADREST

BACKGROUND

The present disclosure relates to child restraints for use by children in vehicles, and in particular, to a juvenile vehicle seat including a backrest and an adjustable headrest mounted for movement on the backrest.

SUMMARY

According to the present disclosure, a child restraint comprises a juvenile vehicle seat including a seat bottom and a seat back. In illustrative embodiments, the child restraint also includes a child-restraint harness coupled to the juvenile vehicle seat.

In illustrative embodiments, the seat back includes a backrest arranged to extend upwardly from the seat bottom and a movable headrest mounted for up-and-down movement on the backrest. The movable headrest includes a headrest cradle and cradle-height controller arranged to interconnect the backrest and the headrest cradle and configured to be operable by a caregiver to control up-and-down movement of the headrest cradle on the backrest.

In illustrative embodiments, the movable headrest also includes a cradle cover made of fabric and mounted on the headrest cradle to move up and down therewith relative to the backrest and an extensible cradle tail having an upper end coupled to the cradle cover to move therewith and a lower end coupled to an anchor panel included in a seat-bottom cover that is mounted on the seat bottom. The extensible cradle tail is expandable and contractible to change length during up-and-down movement of the headrest cradle relative to the backrest between RAISED and LOWERED positions so as to cover any forward-facing openings formed in the backrest so that a child seated on the seat bottom is generally not exposed to such openings regardless of the position of the headrest cradle on the backrest. For example, such backrest openings could be defined by an open channel formed in a headrest-mount platform included in the backrest and any adjacent open cavities formed in the front surface of the backrest.

In illustrative embodiments, the extensible cradle tail includes a wide upper panel, a narrow lower panel, and a middle panel located between the wide upper panel and the narrow lower panel. A cradle-cover connector is included in the extensible cradle tail to connect the cradle cover to the upper end of the wide upper panel. An elastic upper-panel connector is included in the extensible cradle tail to connect an upper end of the middle panel to the wide upper panel. An elastic lower-panel connector is included in the extensible cradle tail to connect the lower end of the middle panel to the narrow lower panel. An anchor-panel connector is also included in the extensible cradle tail to connect the lower end of the narrow lower panel to a seat-bottom cover mounted on the seat bottom.

In illustrative embodiments, the elastic upper-panel and lower-panel connectors can expand in length during upward movement of the headrest cradle away from the seat bottom to lengthen the extensible headrest tail and contract in length to shorten the extensible headrest tail as the headrest cradle moves downwardly on the backrest towards the seat bottom. In a CONTRACTED state of the extensible cradle tail that is extant when the headrest cradle occupies a LOWERED position on the backrest, the middle panel is telescopically received (in whole or in part) in a middle-panel receiver formed in the wide upper panel and the lower panel is telescopically received (in whole or in part) in a lower-panel receiver formed in the middle panel so as to decrease the effective length of the extensible cradle tail. In an EXPANDED state of the extensible cradle tail that is extant when the headrest cradle occupies a relatively higher RAISED position on the backrest, the middle panel is withdrawn (in whole or in part) from the middle-panel receiver formed in the wide upper panel and the narrow lower panel is withdrawn in whole or in part from the lower-panel receiver formed in the middle panel so as to increase the effective length of the extensible cradle tail.

In illustrative embodiments, the juvenile vehicle seat further includes a backrest cover mounted on the backrest and a seat-bottom cover mounted on the seat bottom. The seat-bottom cover includes a seat pad that is arranged to underlie and support a child seated on the seat bottom and an anchor panel that is mounted on a rear edge of the seat pad for pivotable movement about a horizontal pivot axis toward and away from the backrest. In use, a rearwardly facing side of the anchor panel engages the front surface of the backrest. The anchor-panel connector is included in the extensible cradle tail to connect the lower end of the narrow lower panel to the anchor panel of the seat-bottom cover. Such a connection serves to anchor the lower end of the extensible cradle tail to the seat-bottom cover so that the extensible cradle tail can expand and contract in length while allowing up-and-down movement of the headrest cradle that is coupled to the cradle cover relative to the backrest.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which.

DETAILED DESCRIPTION

Figure 1:
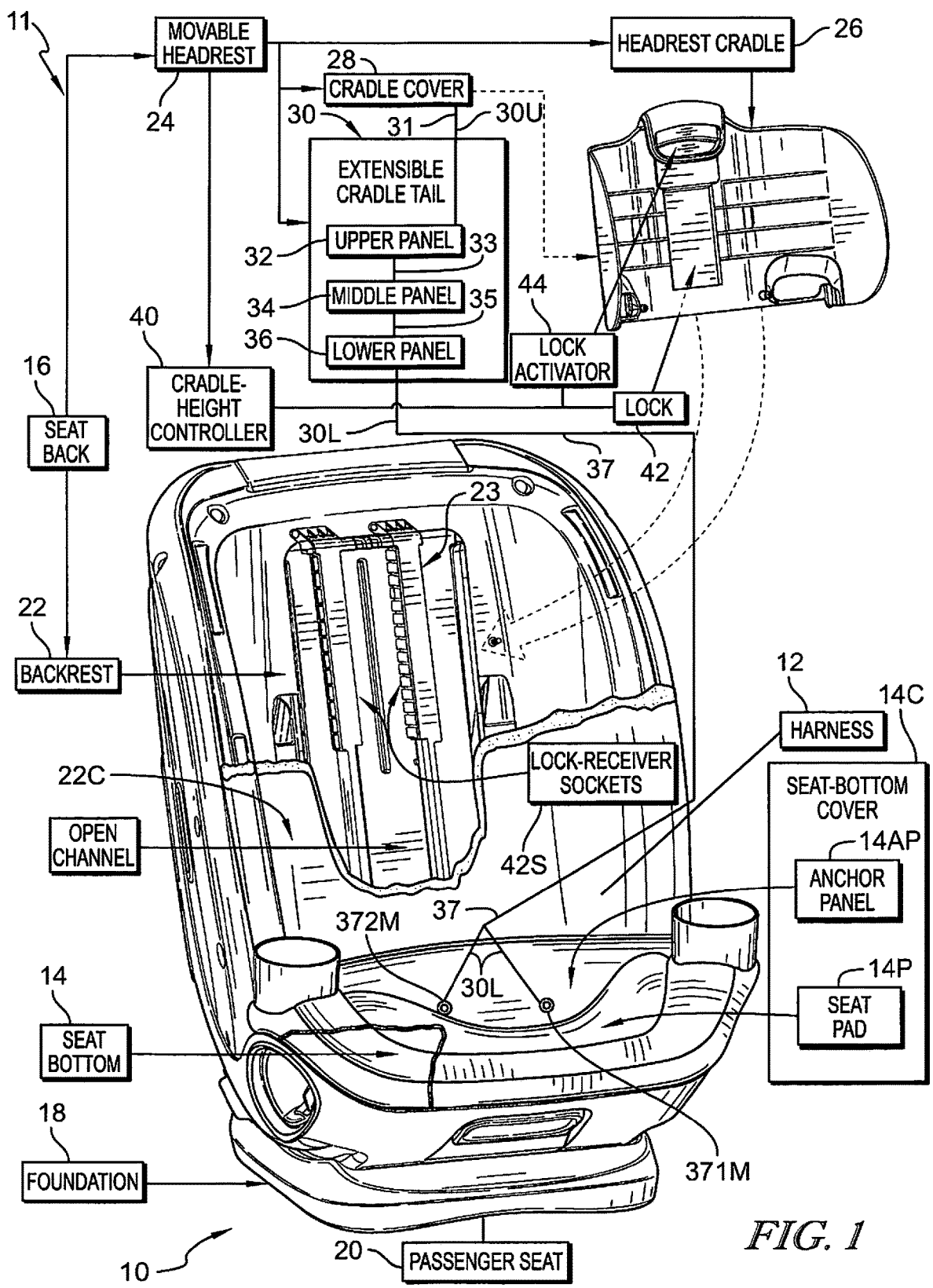
FIG. 1 is a perspective view of a juvenile vehicle seat in accordance with the present disclosure suggesting that the movable headrest includes a headrest cradle that is configured to support the head of a seated child and that can be moved up-and-down on a backrest by a caregiver between RAISED and LOWERED positions using a cradle-height controller and suggesting that the movable headrest also includes a cradle cover that is made of fabric and adapted to be mounted on the headrest cradle and an extensible cradle tail that has an upper end coupled to the cradle cover and a lower end coupled to an anchor panel included in a seat-bottom cover that is mounted on a seat bottom of the juvenile vehicle seat, with a portion of a seat-back cover being broken away to show a headrest-mount platform that is included in the backrest and configured to mate with a cradle-elevation lock also included in the cradle-height controller and coupled to a rear side of the headrest cradle as suggested diagrammatically in FIG. 1.
Figure 6:
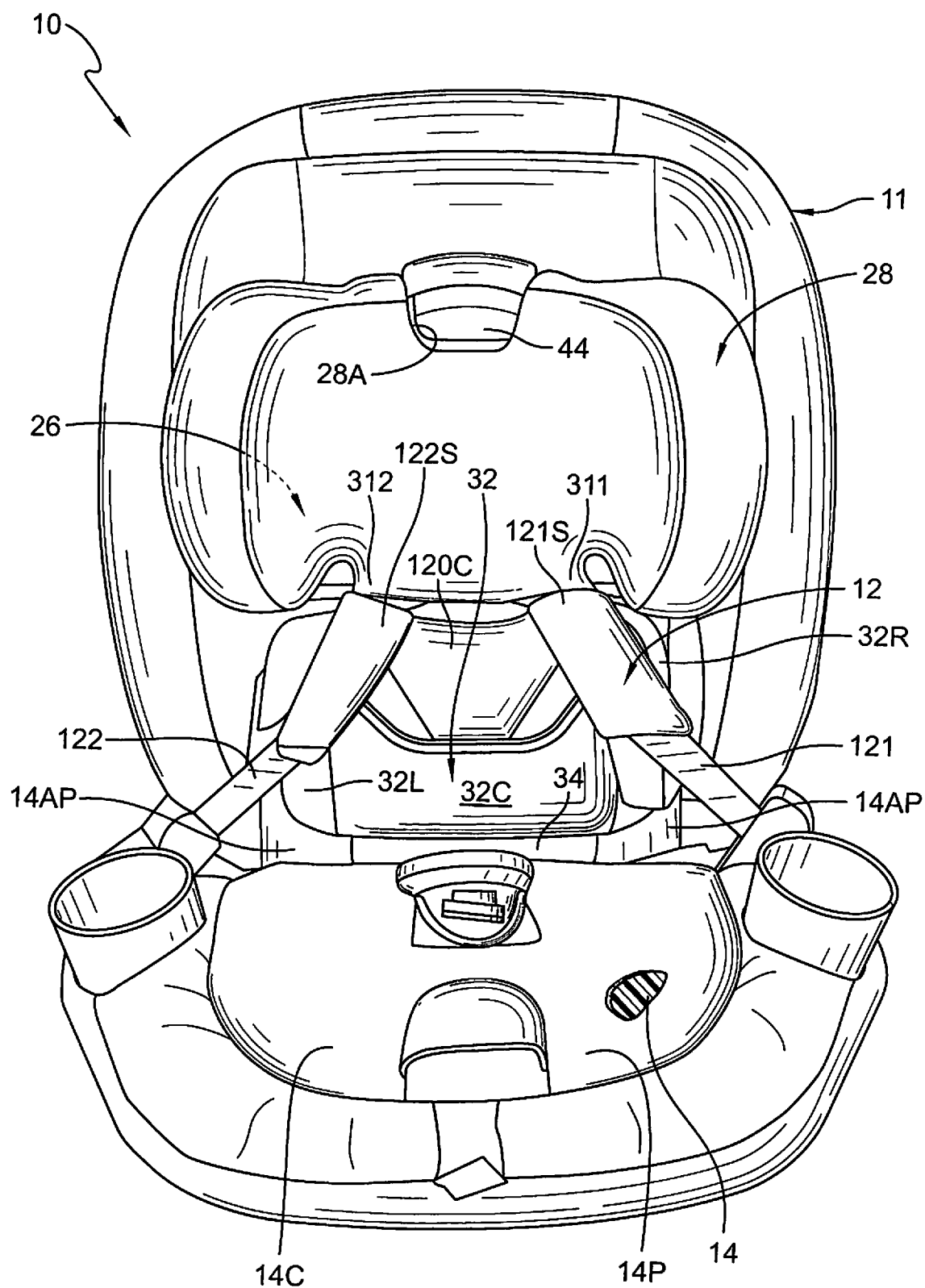
FIG. 6 is a front perspective view of the child restraint of FIG. 5 showing the headrest cradle in a LOWERED position on the backrest and the extensible cradle tail in a CONTRACTED state wherein the narrow lower panel is telescopically received in a lower-panel receiver formed in the middle panel and the middle panel is telescopically received in a middle-panel receiver formed in the wide upper panel.
Figure 7:
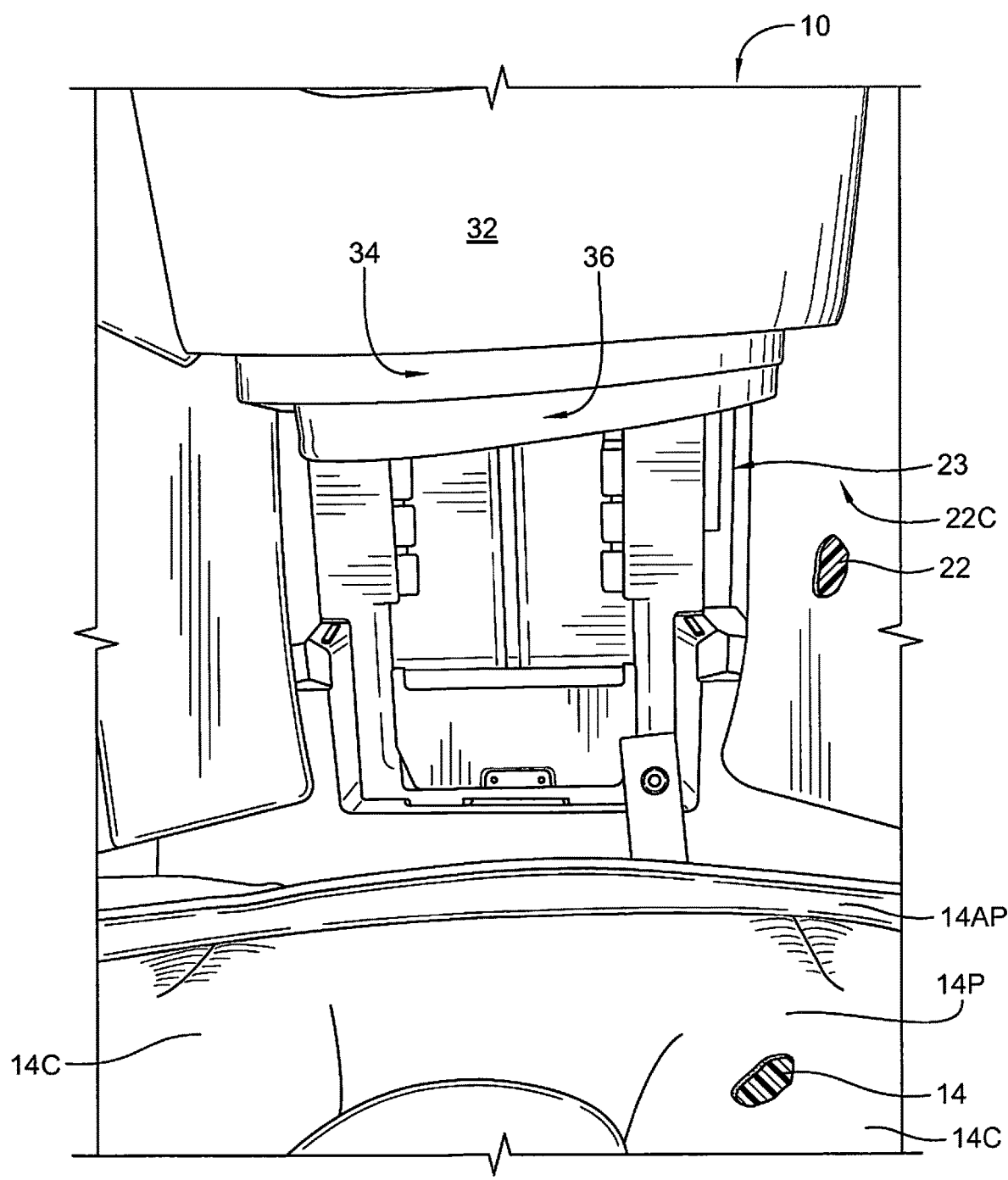
FIG. 7 is an enlarged perspective view of a portion of the juvenile vehicle seat of FIGS. 5 and 6 showing a lower portion of the headrest-mount platform and forward-facing openings formed therein and in adjacent portions of the backrest after the middle and narrow lower panels have been raised upwardly to assume temporary positions exposing the lower portion of the headrest-mount platform and the anchor panel has been folded forwardly away from the backrest.
Figure 8:
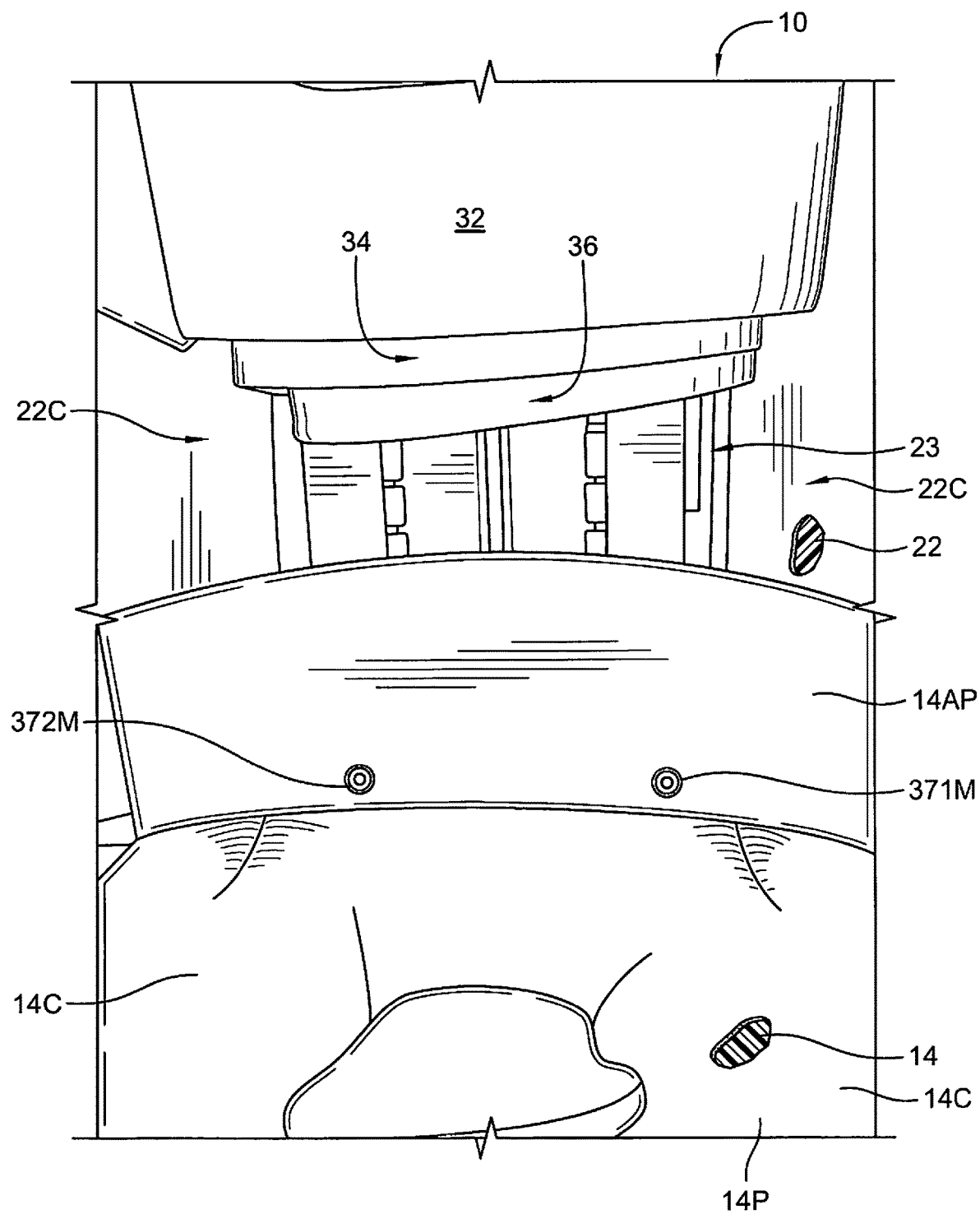
FIG. 8 is a view similar to FIG. 7 after the anchor panel of the seat-bottom cover has been pivoted in a rearward direction toward the backrest to cover a lower portion of the headrest-mount plate and expose the two male snaps coupled to the front side of the anchor panel and included in the anchor-panel connector of the extensible cradle tail.

A child restraint 10 compromises a juvenile vehicle seat 11 and a child-restraint harness 12 coupled to juvenile vehicle seat 11 as shown diagrammatically in FIG. 1 and illustratively in FIG. 6. Juvenile vehicle seat 11 includes a seat bottom 14 and a seat back 16 as suggested in FIG. 1. In an illustrative embodiment, seat bottom 14 is supported by a foundation 18 that is adapted to set on an underlying passenger seat 20 in a vehicle (not shown) as suggested in FIG. 1.

Seat back 16 includes a backrest 22 that is arranged to extend upwardly from seat bottom 14 and a movable headrest 24 that can be mounted on a headrest-mount plate 23 included in backrest 22 as suggested in FIG. 1. Seat bottom 14 is covered by a seat-bottom cover 14C and backrest 22 is covered by a backrest cover 22C as suggested in FIGS. 1 and 6. Seat-bottom cover 14C includes a seat pad 14P and a pivotable anchor panel 14AP as shown, for example, in FIGS. 1 and 5. Seat pad 14P covers seat bottom 14 and anchor panel 14AP is adapted to lie against a lower portion of backrest 22 as suggested in FIGS. 1 and 5.

Figure 5:
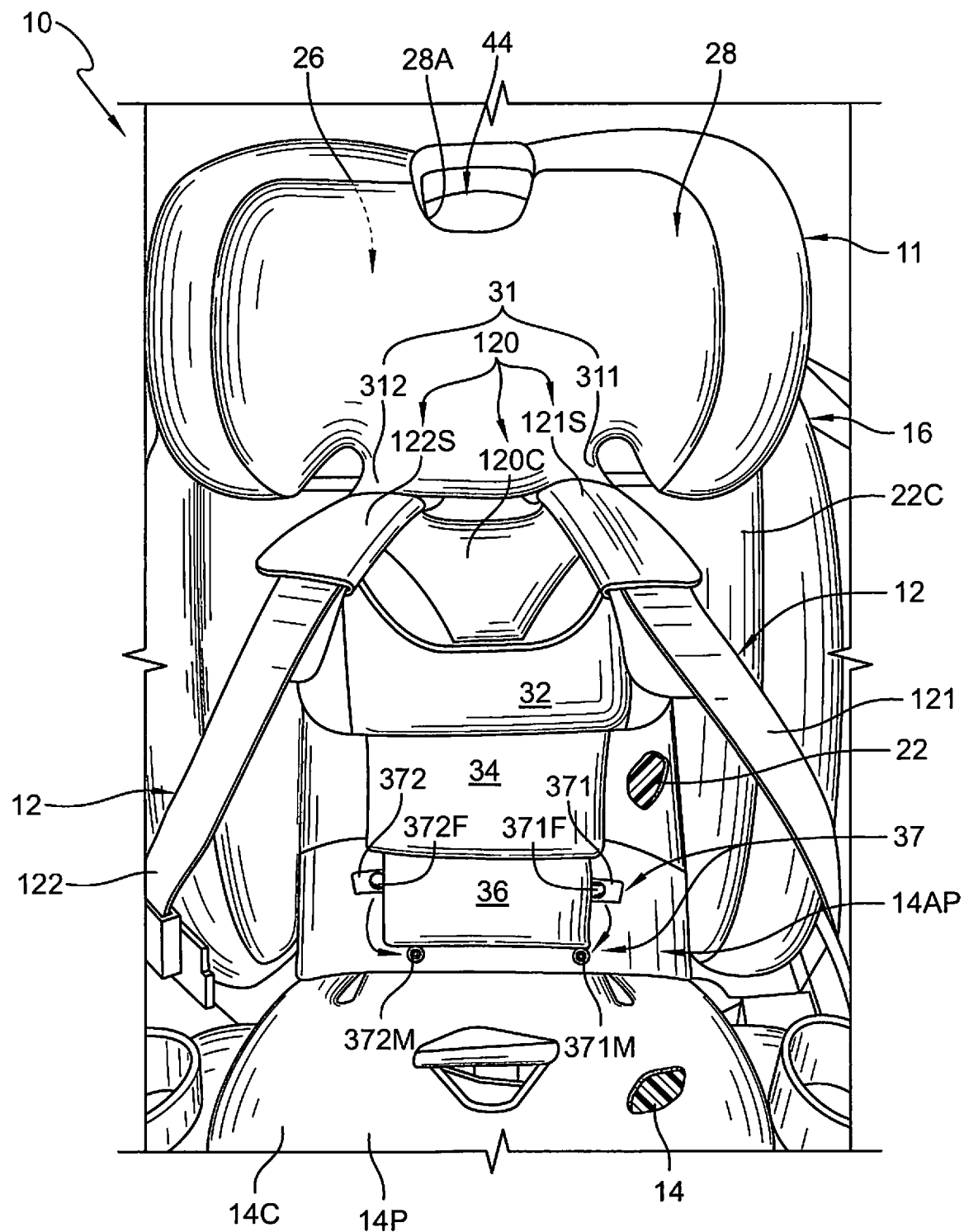
FIG. 5 is a partial perspective view of a child restraint including the juvenile vehicle seat of FIG. 1 showing that a child restraint in accordance with the present disclosure also includes a child-restraint harness coupled to the juvenile vehicle seat and showing that the headrest cradle is maintained in a RAISED position on the backrest and the cradle cover is mounted on the headrest cradle while the extensible cradle tail is maintained in an EXPANDED state to cover the underlying headrest-mount platform shown (in part) in FIGS. 1, 6, and 7 and also showing that the extensible cradle tail further includes an anchor-panel connector comprising separate first and second straps and a strap retainer for each strap comprising a female snap on the strap and a companion male snap on an anchor panel included in the seat-bottom cover mounted on the seat bottom.

Movable headrest 24 includes a headrest cradle 26 that is arranged to be moved up and down relative to backrest 22 as suggested in FIGS. 5 and 6 under the control of a caregiver to support the head of seated children of various sizes and ages. Movable headrest 24 also includes a cradle cover 28 and an extensible cradle tail 30 that has a variable effective length as suggested diagrammatically in FIG. 1 and shown illustratively in FIGS. 2, 5, and 6.

Cradle cover 28 of movable headrest 24 is sized and shaped to be mounted on headrest cradle 26 to move up and down therewith relative to backrest 22 and to the underlying seat bottom 14 as suggested in FIGS. 5 and 6. An upper end 30U of extensible cradle tail 30 is coupled to cradle cover 28 and a lower end 30L of extensible cradle tail 30 is coupled to seat-bottom cover 14C as suggested diagrammatically in FIG. 1 and illustratively in FIGS. 5 and 9. Lower end 30L of extensible cradle tail 30 is coupled to a tail anchor that is located in a stationary position along a lower portion of backrest 22. An anchor panel 14AP illustratively senses as such a tail anchor as discussed herein and shown in FIG. 1. It is within the scope of the present disclosure to include the tail anchor in a lower portion of backrest 22 or a rear portion of seat bottom 14. As suggested in FIG. 5, the effective length of extensible cradle tail 30 is increased when headrest cradle 26 is moved upwardly on backrest 22 away from seat bottom 14 to a RAISED position. As suggested in FIG. 6, the effective length of extensible cradle tail 30 is decreased when headrest cradle 26 is moved downwardly on backrest 22 toward seat bottom 14 to a LOWERED position.

Figure 2:
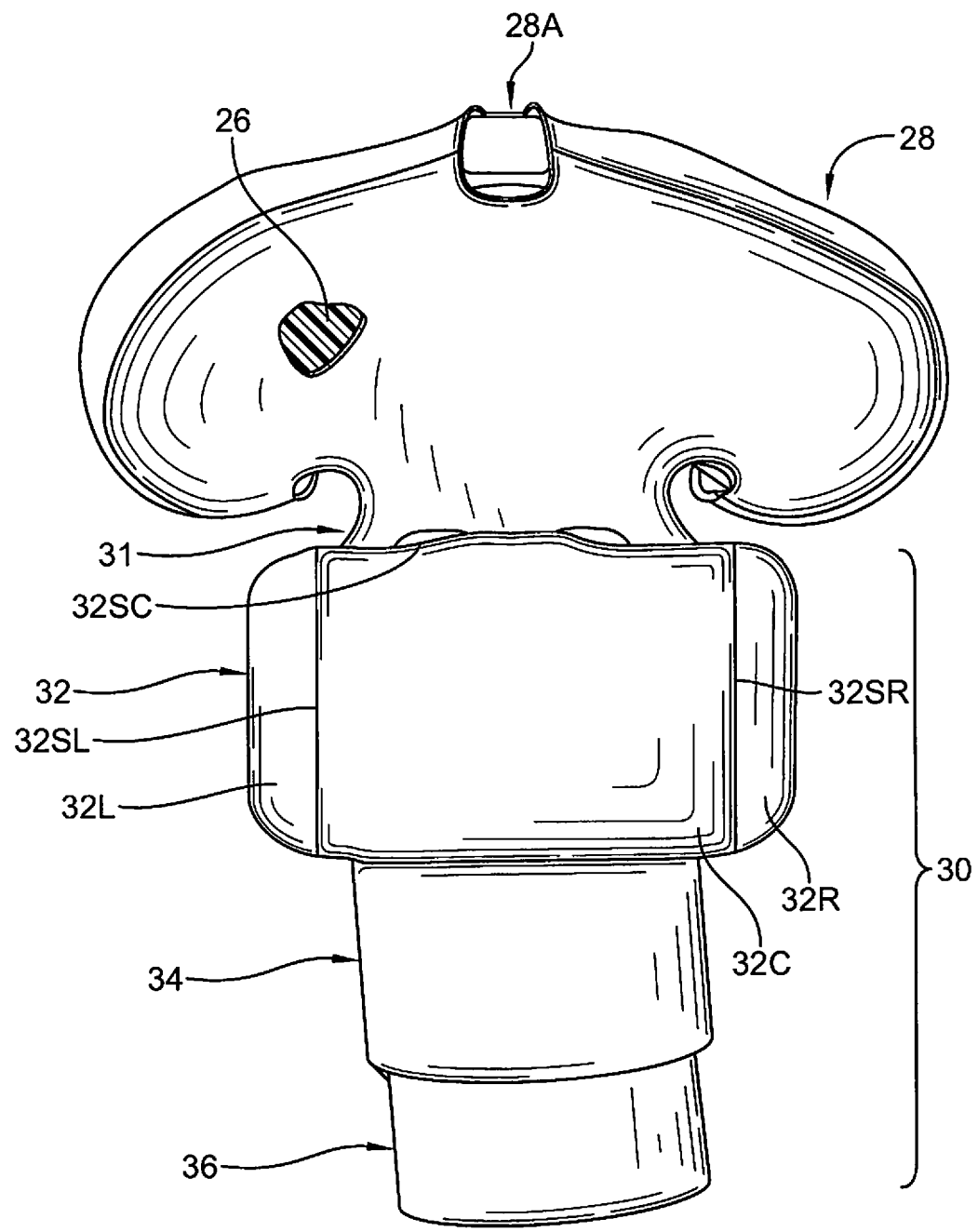
FIG. 2 is a front elevation view of a front side of an illustrative cradle cover and the extensible cradle tail and showing that the extensible cradle tail comprises a wide upper panel below the cradle cover, a middle panel below the wide upper panel, and a narrow lower panel below the middle panel.
Figure 3A:
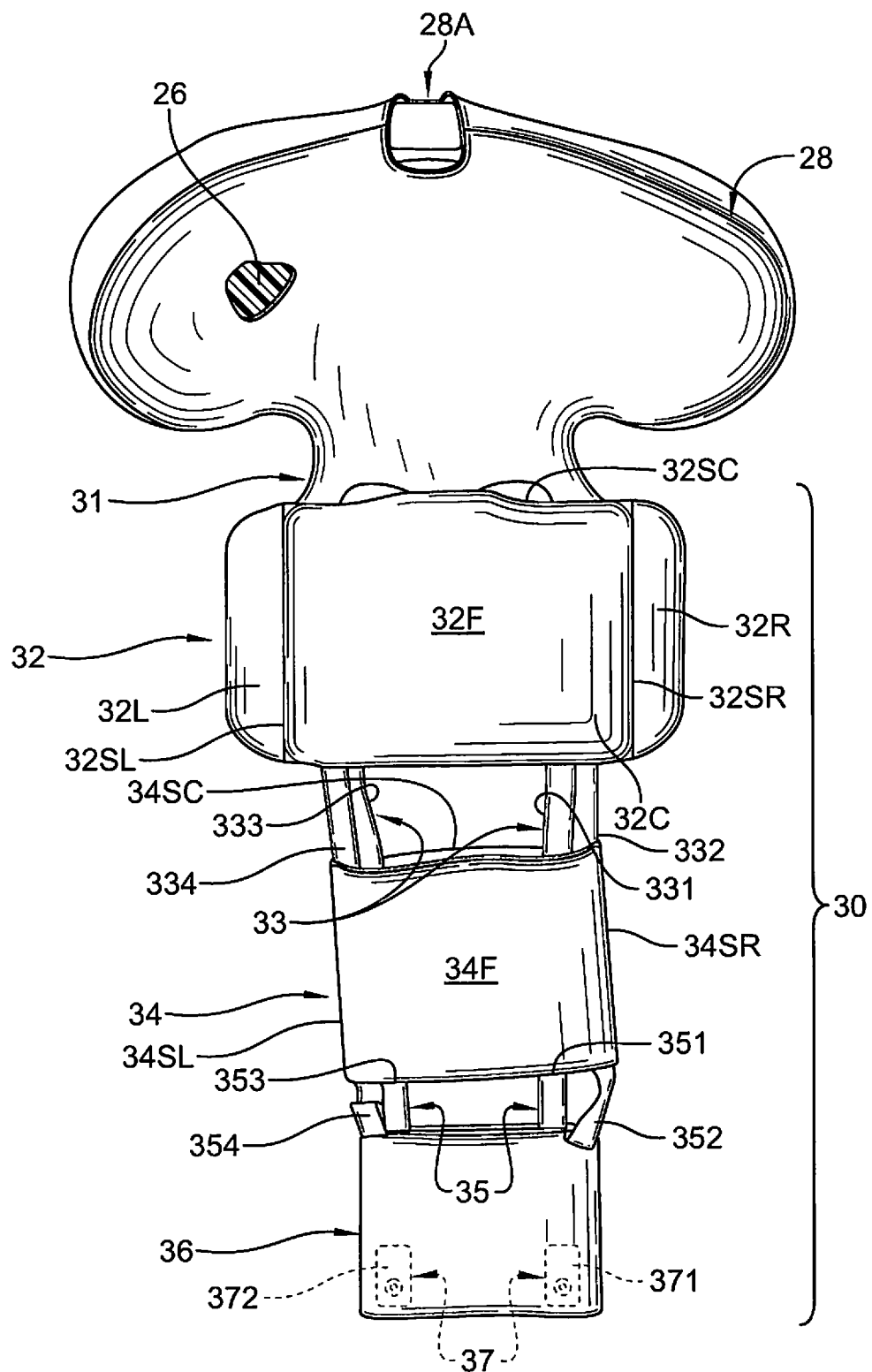
FIG. 3A is a front elevation view similar to FIG. 2 but showing an illustrative separation of the three panels and showing an elastic upper-panel connector that is arranged to interconnect a lower end of the wide upper panel and an upper end of the middle panel and an elastic lower-panel connector that is arranged to interconnect a lower end of the middle panel and an upper end of the narrow lower panel and showing the elastic upper-panel and lower panel connectors in EXPANDED states.
Figure 3B:
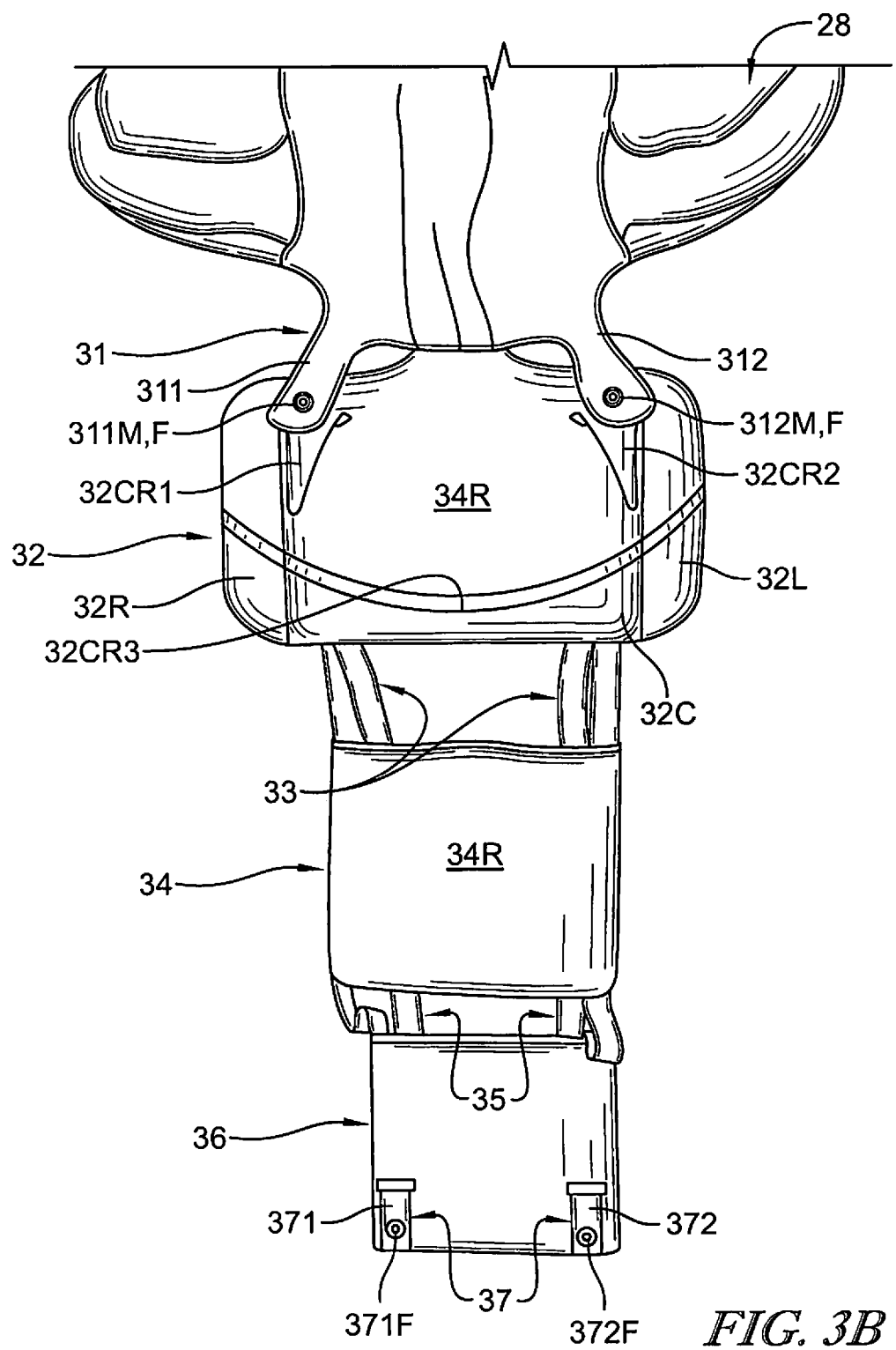
FIG. 3B is a view similar to FIG. 3A but showing the back side of the cradle cover and the extensible cradle tail and also showing a cradle-cover connector that is included in the extensible cradle tail and arranged to interconnect a lower end of the cradle cover and an upper end of the wide upper panel.

Extensible cradle tail 30 comprises, in series, top to bottom, a cradle-cover connector 31, a wide upper panel 32, an elastic upper-panel connector 33, a middle panel 34, an elastic lower-panel connector 35, a lower panel 36, and an anchor-panel connector 37 as shown, for example, in FIGS. 3A and 3B. The elastic upper-panel and lower-panel connectors 33, 35 can expand in length as suggested in FIGS. 3A and 3B to lengthen the extensible cradle tail 30 when the extensible cradle tail 30 assumes an EXPANDED state and can contract in length as suggested in FIG. 2 to shorten the extensible cradle tail 30 when the extensible cradle tail 30 assumes a CONTRACTED state.

Upper-panel connector 33 comprises elastic first and second right-side straps 331, 332 and elastic first and second left-side straps 333, 334 as suggested in FIG. 3A. Straps 332, 334 are relatively larger in length than straps 331, 33. A lower end of each of straps 331, 333 is coupled to an upper portion of middle panel 34 and an upper end of each of straps 331, 332 is coupled to a lower portion of front sheet 32F of wide upper panel 32. A lower end of each of straps 332, 334 is coupled to an upper portion of middle panel 34 and an upper end of each of straps 332, 334 is coupled to an upper portion of front sheet 32F of wide upper panel 32. The side-by-side pair of straps 331, 332 is laterally spaced-apart from the side-by-side pair of straps 333, 334 as shown in FIG. 3A.

Lower-panel connector 35 comprises elastic first and second right-side straps 351, 352 and elastic first and second right-side straps 353, 354 as suggested in FIG. 3A. Straps 352, 354 are relatively longer in length than straps 351, 353. A lower end of each of straps 351, 353 is coupled to an upper portion of narrow lower panel 36 and an upper end of each of straps 351, 353 is coupled to a lower portion of front sheet 34F of middle panel 34. A lower end of each of straps 352, 354 is coupled to an upper portion of narrow lower panel 36 and an upper end of each of straps 352, 354 is coupled to an upper portion of front sheet 34F of wide upper panel 32. The side-by-side pair of straps 351, 352 is laterally spaced-apart from the side-by-side pair of straps 353, 354 as shown in FIG. 3A.

Extensible cradle tail 30 expands and contracts in length as needed during up-and-down movement of headrest cradle 26 relative to backrest 22 to maintain a generally flat surface behind a child seated on seat bottom 14 as the elevation of headrest cradle 26 above seat bottom 14 is changed by a caregiver. Extensible cradle tail 30 allows for up-and-down movement of headrest cradle 26 along backrest 22 while a child is seated in juvenile vehicle seat 11. The child's weight is directed more toward seat bottom 14 rather than extensible cradle tail 30 making it easier to adjust movable headrest 24 to change the elevation of headrest cradle 26 while the child is sitting on the juvenile vehicle seat 11. Extensible cradle tail 30 comprises a fabric soft goods assembly that telescopes into itself when headrest cradle 26 is moved up and down on backrest 22.

Movable headrest 24 also includes a cradle-height controller 40 that is mounted on headrest cradle 26 for up-and-down movement therewith relative to backrest 22 as suggested in FIG. 1. In an illustrative embodiment, cradle-height controller 40 includes a headrest lock 42 for engaging and disengaging lock-receiver sockets 42S formed in a headrest-mount plate 23 backrest 22 and shown in FIG. 1. Headrest lock 42 illustratively includes motion blockers (not shown) that are sized and shaped to extend laterally into lock-receiver sockets 42S and blocker movers (not shown) that are linked in a suitable manner to the motion blockers. Illustrative and suitable motion blockers and blocker movers are disclosed in U.S. application Ser. No. 16/142,729, which disclosure is hereby incorporated in its entirety by reference herein.

Cradle-height controller 40 also includes a lock activator 44 that is linked to the blocker movers of headrest lock 42 and can be moved by a caregiver relative to headrest cradle 26 to activate the blocker movers to cause the motion blockers to move relative to headrest cradle 26 to engage or disengage lock-receiver sockets 42S formed in backrest 22. Lock activator 44 can be operated by a caregiver to activate headrest lock 42 when it is desired to disengage the motion blockers in headrest lock 42 from the lock-receiver sockets 42S formed in backrest 22 to free headrest cradle 26 for up-and-down movement on backrest 22 as suggested, for example, in U.S. application Ser. No. 16/142,729.

Figure 4:
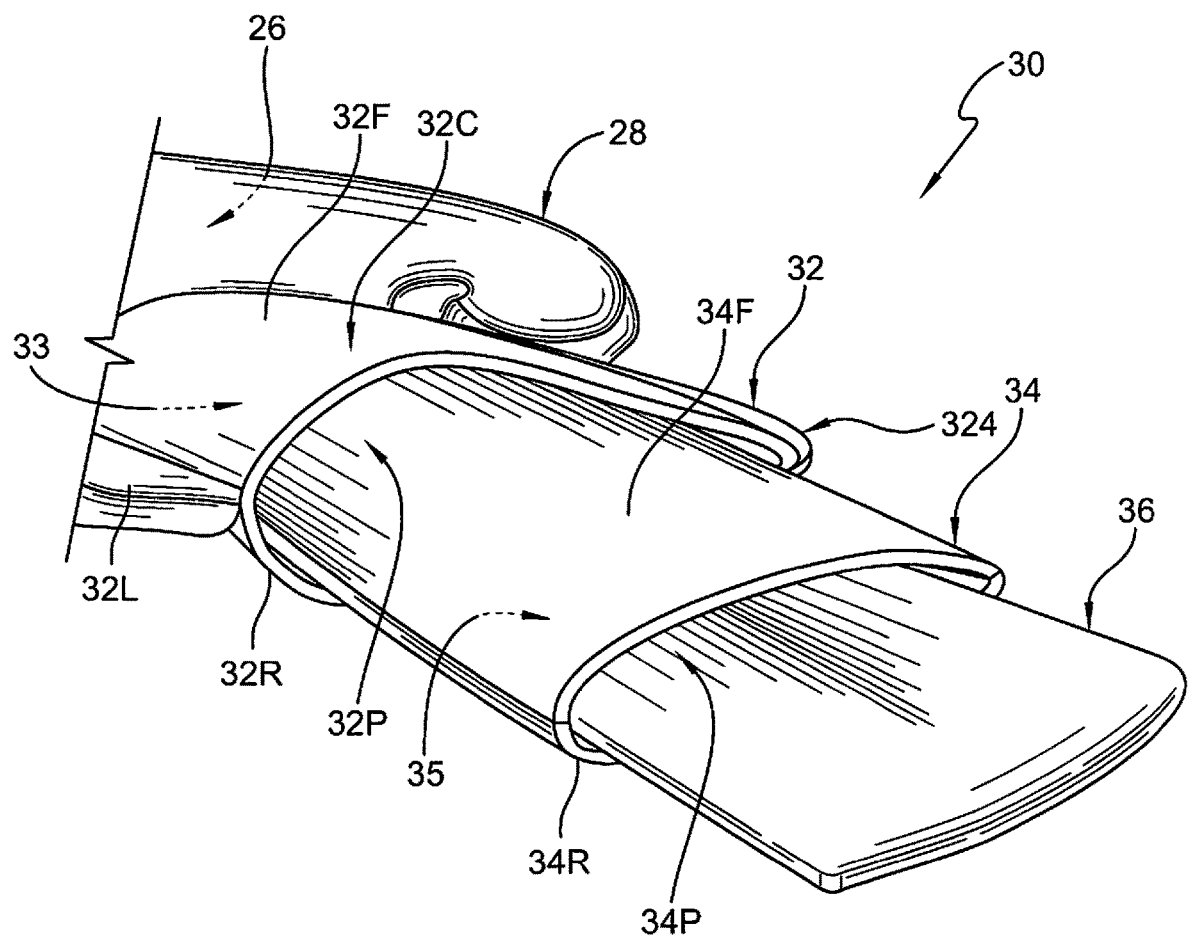
FIG. 4 is an enlarged partial perspective view of the cradle cover and extensible cradle tail of FIG. 2 showing that the wide upper panel comprises a front and rear sheet that cooperate to form a downwardly opening pocket providing a middle-panel receiver receiving a portion of the middle panel and also showing that the middle panel comprises a front and rear sheet that cooperate to form a downwardly opening pocket providing a lower-panel receiver receiving a portion of the narrow lower panel.

Wide upper panel 32 of extensible cradle tail 30 comprises a center sleeve 32C flanked by pivotable left and right flaps 32L, 32R as suggested in FIG. 2. Center sleeve 32C comprises a front sheet 32F shown in FIGS. 2 and 3 and a rear sheet 32R shown in FIG. 4. Front and rear sheets 32F, 32R are joined together along left, center, and right seams 32SL, 32SC, and 32SR to form a downwardly opening pocket 32P between front and rear sheets 32F, 32F as suggested in FIGS. 2 and 4. Pocket 32P provides a middle-panel receiver that is shown in FIG. 4 and is sized to receive an upper portion of middle panel 34 and the elastic upper-panel connector 33 therein as suggested in FIGS. 2, 5, and 6. Left seam 32SL separates left flap 32L and center sleeve 32C as suggested in FIG. 3A. Right seam 32SR separates center sleeve 32C and right flap 32R as suggested in FIG. 3A.

Wide upper panel 32 further comprises card retainer means 32CR coupled to an exterior surface 32E of rear sheet 32R for receiving a card (not shown) as suggested in FIG. 3B so that the card is retained in a stored position on rear sheet 32R and can be removed and replaced at the option of a caregiver. The card could be a rigidifier or an instruction card in illustrative embodiments of the present disclosure. The card retainer means comprises a first corner receiver 32CR1, a laterally spaced-apart second corner receiver 32CR2, and a bottom receiver 32CR3 located below and in vertically spaced-apart relation to the overlying first and second corner receivers 32CR1, 32CR2 as shown, for example, in FIG. 3B. Each receiver 32CR1-CR3 cooperates with rear sheet 32R to provide a pocket therebetween for receiving and retaining a portion of the rigidifier or instruction card.

Middle panel 34 of extensible cradle tail 30 is a sleeve that comprises a front sheet 34F shown in FIGS. 2 and 3 and a rear sheet 34R as shown in FIG. 4. Front and rear sheets 34F, 34R are joined together along left, center, and right seams 34SL, 34SC, and 34SR to form a downwardly opening pocket 34P between front and rear sheets 34F, 34R as suggested in FIGS. 3A and 4. Pocket 34P provides a lower-panel receiver that is shown in FIG. 4 and is sized to receive lower panel 36 and the elastic lower-panel connector 35 therein as suggested in FIGS. 2, 5, and 6.

Cradle cover 28 of movable headrest 24 is illustratively made of fabric and configured to be mounted on headrest cradle 26 as suggested in FIGS. 2 and 4. Cradle cover 28 is formed to include an access aperture 28A along the top edge as suggested in FIGS. 2 and 3A to provide caregiver access to lock activator 44 shown in FIG. 1.

Extensible cradle tail 30 includes an upper end 30U that is coupled to cradle cover 28 as suggested diagrammatically in FIG. 1 and illustratively in FIGS. 3A and 3B. Upper end 30U comprises cradle-cover connector 31. In an illustrative embodiment, cradle-cover connector 31 comprises a first strap 311 carrying a male snap 311M that can be removably mated to a companion female snap 311F carried on rear sheet 32R of wide upper panel 32 and a second strap 312 carrying a male snap 312M that can be removably mated to a companion female snap 312F carried on rear sheet 32R of wide upper panel 32 as suggested in FIGS. 3B, 5, and 9.

Anchor-panel connector 37 of extensible cradle tail 30 is used to couple extensible cradle tail 30 to anchor panel 14AP of seat-bottom cover 14C as suggested in FIGS. 1, 5, 6, and 9. Anchor-panel connector 37 includes a first strap 371 carrying a first female snap 371F that can be removably mated to a companion first male snap 371M carried on a front side of anchor panel 14AP as suggested in FIG. 5. Anchor-panel connector 37 also includes a second strap 372 carrying a second female snap 37RF that can be removably mated to a companion second male snap 372M carried on front side of anchor panel 14AP and arranged to lie in laterally spaced-apart relation to first male snap 371M as suggested in FIG. 5.

Figure 9:
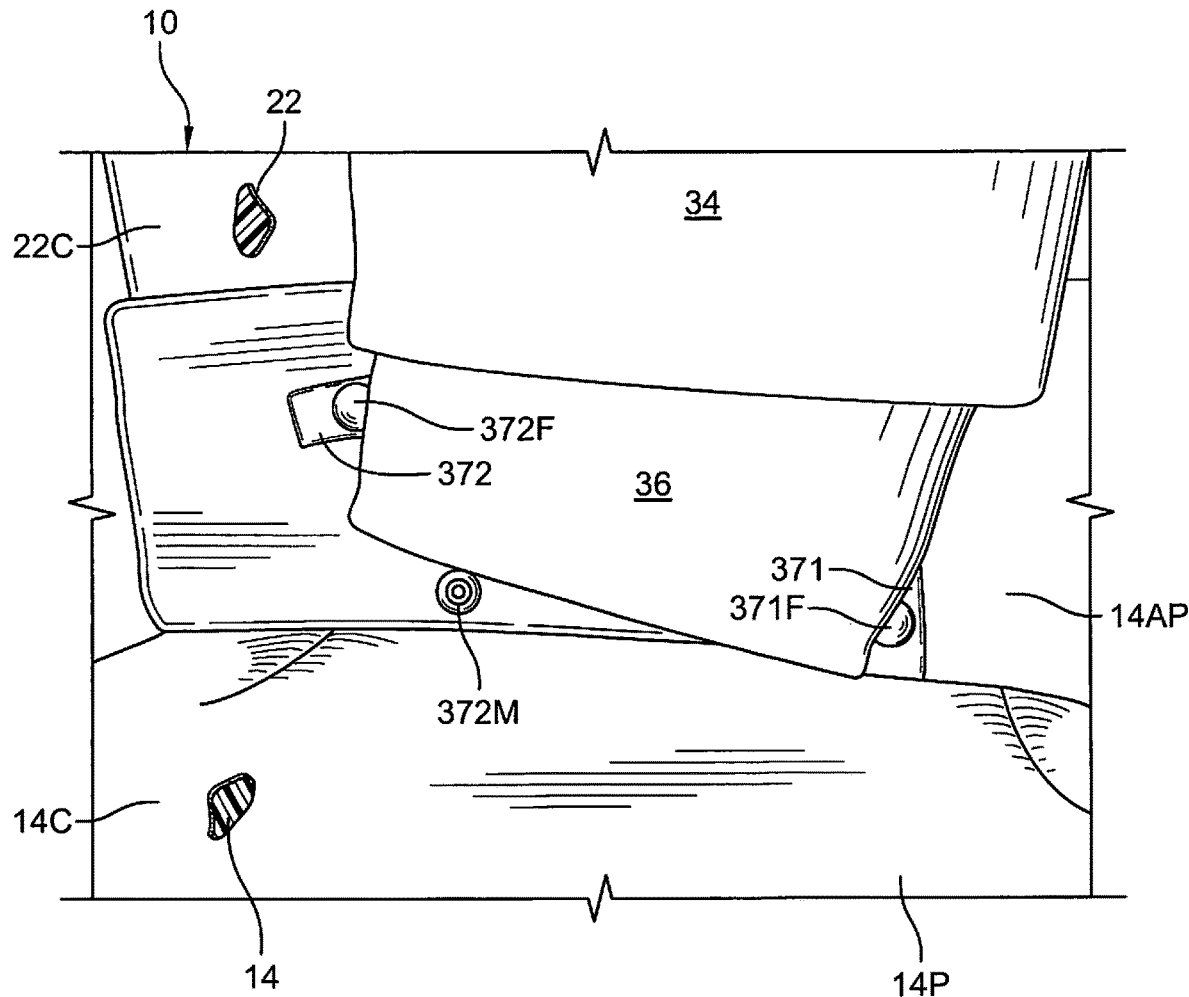
FIG. 9 is an enlarged perspective view of the juvenile vehicle seat of FIG. 8 showing mating engagement of the female snap on the first strap of the anchor-panel connector with a companion male snap mounted on a right side of the anchor panel of the seat-bottom cover to couple a lower end of the extensible cradle tail to the seat-bottom cover.

In use, cradle cover 28 is coupled to headrest cradle 26, the first and second straps 311, 312 of cradle-cover connector 31 are used to couple cradle cover 28 to wide upper panel 32 of extensible cradle tail 30, and the first and second straps 371, 372 of anchor-panel connector 37 are used to couple narrow lower panel 36 of extensible cradle tail 30 to anchor panel 14AP of bottom-seat cover 14C as suggested in FIGS. 1, 3B, and 9. Owing to the telescoping interaction and arrangement of upper, middle, and lower panels 32, 34, 36 and the elastic character of panel connectors 33, 35 of extensible cradle tail 30, extensible cradle tail 30 can lengthen and shorten as needed automatically to ensure that forward-facing openings in backrest 22 are covered as a caregiver raises and lowers headrest cradle 26 on backrest 22 as suggested in FIGS. 5 and 6 to adjust movable headrest 24 to suit the size of a child seated in juvenile vehicle seat 11.

Figure 10:
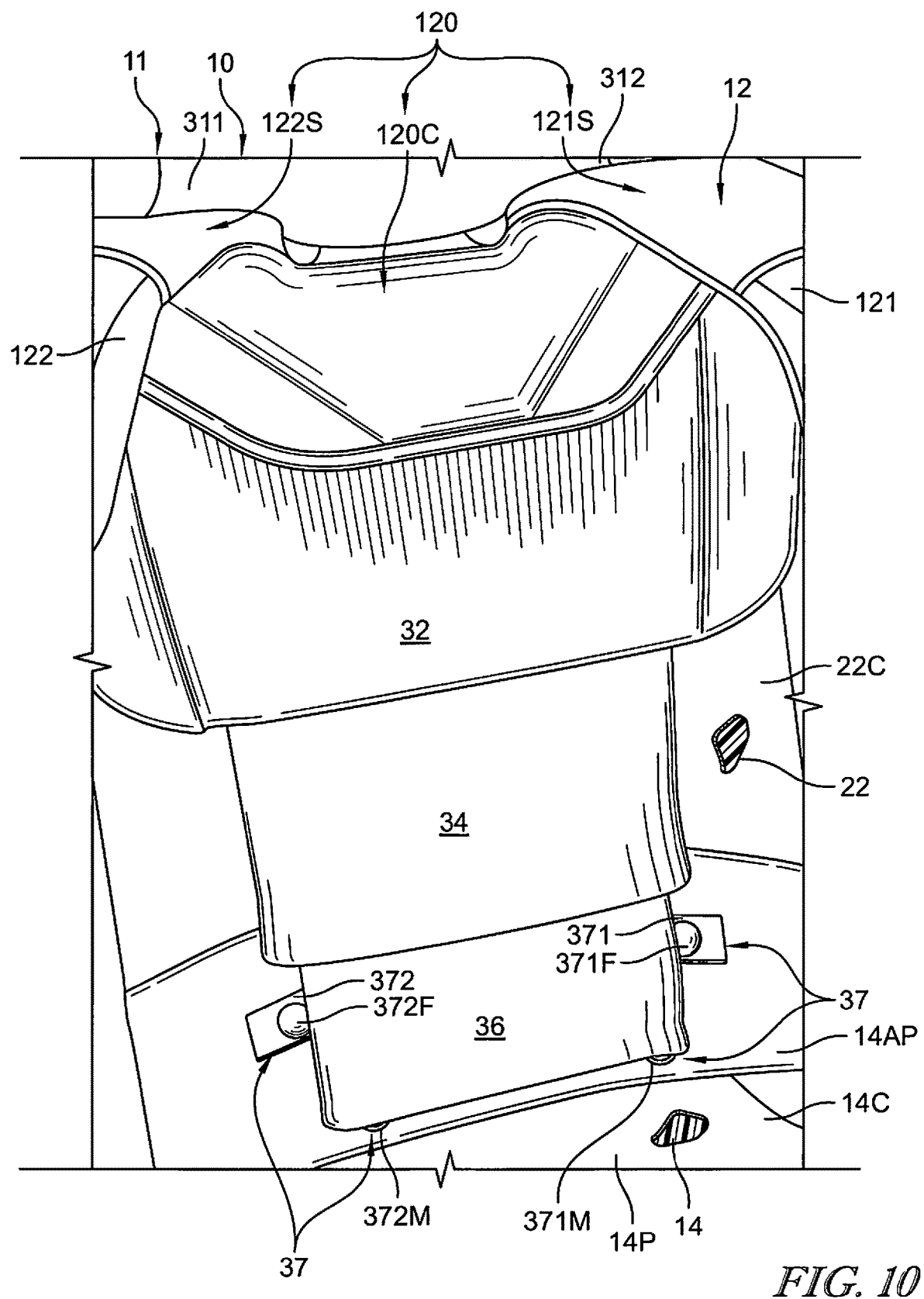
FIG. 10 is an enlarged view of a portion of the juvenile vehicle seat shown in FIG. 5 to show that the child-restraint harness comprises a spring-loaded clamp panel located between upper ends of left and right shoulder belts and showing that the spring-loaded clamp panel has been pivoted upwardly about a horizontal panel-pivot axis to load a panel-biasing spring coupled to the clamp panel and included in the child-restraint harness.
Figure 11:
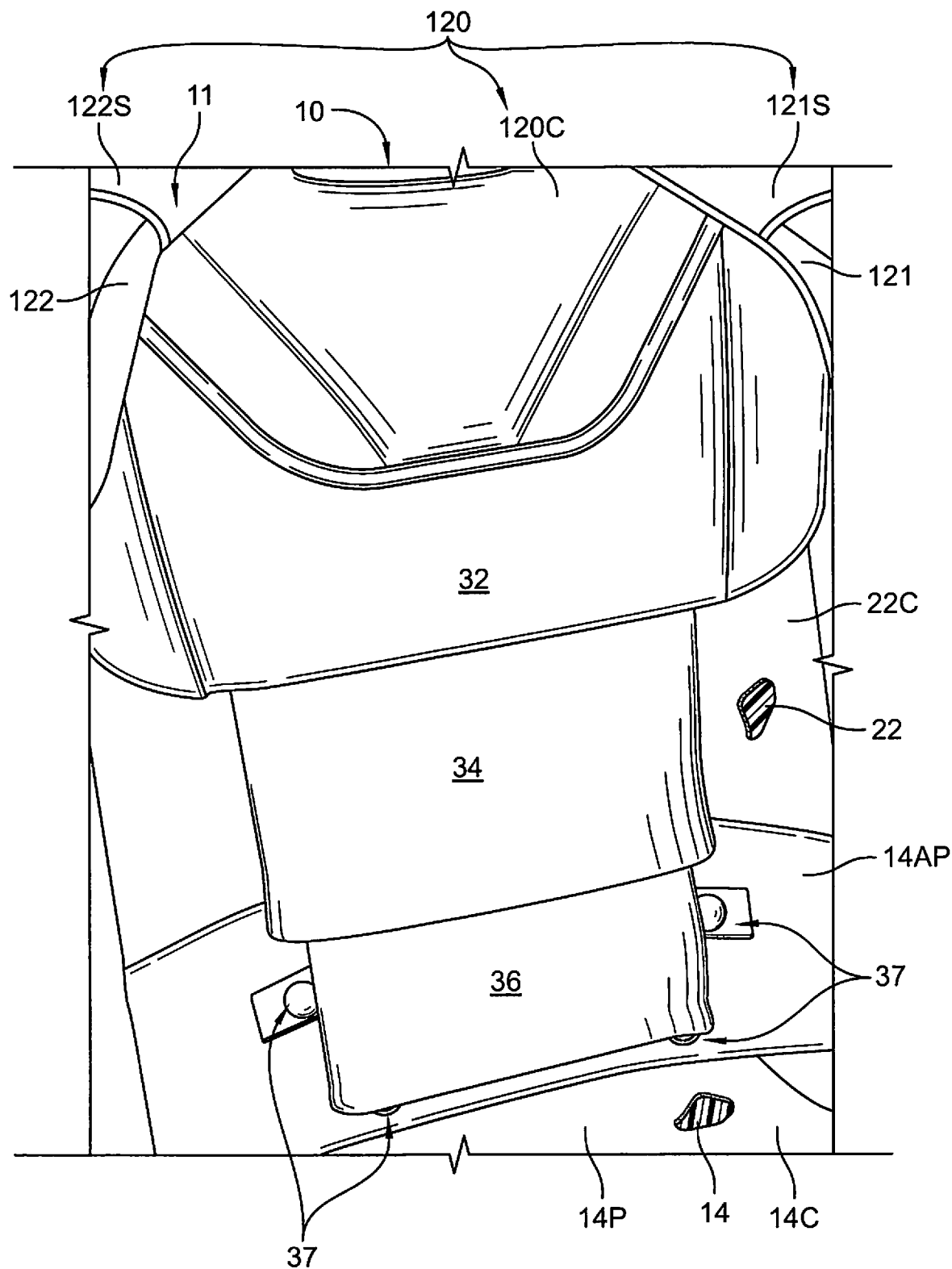
FIG. 11 is a view similar to FIG. 10 showing that the panel-biasing spring has pivoted the clamp panel about the horizontal panel-pivot axis to cause the clamp panel to apply pressure to a front side of the cradle cover.

As suggested in FIGS. 5 and 6, child-restraint harness 12 comprises a first shoulder strap 121, a second shoulder strap 122, and a harness accessory 120 comprising a first strap sleeve 121S, a second strap sleeve 122S, and a panel clamp 120C interposed between sleeves 121S, 122S and configured to apply a clamping force to a front face of wide upper panel 32 of extensible cradle tail 30 as suggested in FIGS. 10 and 11. First strap sleeve 121S is wrapped around an upper portion of first shoulder strap 121 while second strap sleeve 122S is wrapped around an upper portion of second shoulder strap 122 as shown in FIGS. 5 and 6. Each of strap sleeves 121S, 122S is configured to be removable from its companion strap 121, 122.

Panel clamp 120C is spring-loaded using any suitable spring means normally to apply a clamping force to wide upper panel 32 as suggested in FIG. 11. As shown in FIGS. 5, 10, and 11, panel clamp 120C is interposed between and coupled to each of first and second strap sleeves 121S, 122S. It is pivoted away from wide upper panel 32 to temporarily to load the spring means as shown in FIG. 10. Once released, panel clamp 120C pivots downwardly to apply a clamping force to a front face of wide upper panel 32 of extensible cradle tail 30 as shown in FIG. 11 and this clamping force is applied at every elevation of headrest cradle 26 above seat bottom 14 because panel clamp 120C travels up and down on backrest 22 with wide upper panel 32 as suggested in FIGS. 5 and 6.

The invention claimed is:

1. A juvenile vehicle seat comprising
a seat bottom and
a seat back including a backrest arranged to extend upwardly from the seat bottom and a movable headrest including a headrest cradle mounted for up-and-down movement on the backrest and a cradle-height controller linked to the headrest cradle and the backrest to control elevation of the headrest cradle above the seat bottom, wherein the movable headrest further includes a cradle cover coupled to the headrest cradle to move therewith relative to the backrest and an extensible cradle tail having an upper end coupled to the cradle cover to move therewith relative to the backrest and a lower end anchored to lie in a stationary position relative to the seat bottom and wherein the extensible cradle tail is expandable and contractible to change length during up-and-down movement of the headrest cradle relative to the backrest between a raised position located at a first distance from the seat bottom and a lowered position located at a relatively smaller second distance from the seat bottom so as to cover forward-facing openings formed in the backrest and located behind the extensible cradle tail and between the seat bottom and the headrest cradle in the raised position.

2. The juvenile vehicle seat of claim 1, further comprising a seat-bottom cover mounted on the seat bottom and the lower end of the extensible cradle tail is coupled to the seat-bottom cover to remain in a fixed position relative to the seat bottom during up-and-down movement of the head cradle relative to the seat bottom.

3. The juvenile vehicle seat of claim 2, wherein the seat-bottom cover includes a seat pad that is arranged to underlie and support a child seated on the seat bottom and an anchor panel that extends upwardly along the backrest and the lower end of the extensible cradle tail is coupled to the anchor panel.

4. The juvenile vehicle seat of claim 3, wherein the anchor panel is mounted on a rear edge of the seat pad for pivotable movement about a pivot axis toward and away from the backrest.

5. The juvenile vehicle seat of claim 3, wherein the anchor panel includes a rear face facing toward the backrest and a front face facing away from the backrest and the lower end of the extensible cradle tail is coupled to the front face of the anchor panel.

6. The juvenile vehicle seat of claim 3, wherein the lower end of the extensible cradle tail includes an anchor-panel connector comprising a first strap, a first female snap carried on the first strap, and a stationary first male snap coupled to the anchor panel and configured to mate with the first female snap to couple the lower end of the extensible cradle tail to the seat-bottom cover.

7. The juvenile vehicle seat of claim 6, wherein the anchor panel includes a rear face facing toward the backrest and a front face facing away from the backrest and the first male snap is coupled to the front face of the anchor panel.

8. The juvenile vehicle seat of claim 1, further comprising an anchor panel that is located in a stationary position alongside the seat bottom during up-and-down movement of the headrest cradle relative to the backrest and wherein the anchor panel includes a rear face facing toward the backrest and a front face facing away from the backrest and the lower end of the extensible cradle tail is coupled to the front face of the anchor panel.

9. The juvenile vehicle seat of claim 8, wherein the lower end of the extensible cradle tail includes a first strap and a strap retainer comprising a first female snap coupled to the first strap and a companion first male snap coupled to the front face of the anchor panel and configured to mate with the first female snap to tether the lower end of the extensible cradle tail to the anchor panel.

10. The juvenile vehicle seat of claim 1, further comprising a tail anchor that is located in a stationary position alongside the backrest and wherein the lower end of the extensible cradle tail is coupled to the anchor.

11. The juvenile vehicle seat of claim 1, wherein the extensible cradle tail includes a wide upper panel, a narrow lower panel, and a middle panel interposed between the wide upper panel and the narrow lower panel, the extensible cradle tail is configured to assume a contracted state characterized by a first length when the headrest cradle occupies the lowered position on the backrest to cause the middle panel to be telescopically received in a middle-panel receiver formed in the wide upper panel and the narrow lower panel to be telescopically received in a lower-panel receiver formed in the middle panel so as to decrease an effective length of the extensible cradle tail, and the extensible cradle tail is also configured to assume an expanded state characterized by a relatively longer second length when the headrest cradle occupies the raised position on the backrest to cause the middle panel to be withdrawn from the middle-panel receiver formed in the wide upper panel and the narrow lower panel to be withdrawn from the lower-panel receiver formed in the middle panel so as to increase the effective length of the extensible cradle tail.

12. The juvenile vehicle seat of claim 11, wherein the extensible cradle tail further includes a cradle-cover connector arranged to connect the cradle cover to an upper end of the wide upper panel, an upper-panel connector arranged to connect an upper end of the middle panel to the wide upper panel, a lower-panel connector arranged to connect a lower end of the middle panel to the narrow lower panel, and an anchor-panel connector arranged to connect a lower end of the narrow lower panel to an anchor panel located in a stationary position on the backrest during up-and-down movement of the headrest cradle relative to the backrest.

13. The juvenile vehicle seat of claim 12, wherein each of the upper-panel and lower-panel connectors comprise at least one elastic strap configured to stretch within an elastic limit from an original shape during upward movement of the headrest cradle to the raised position and to recover the original shape during downward movement of the headrest cradle to the lowered position.

14. The juvenile vehicle seat of claim 12, wherein each of the upper-panel and lower-panel connectors comprise at least one strap that is configured to deform and change shape during downward movement of the headrest cradle from the raised position to the lowered position.

15. The juvenile vehicle seat of claim 12, wherein the upper-panel connector lies in the middle-panel receiver formed in the wide upper panel and the lower-panel connector lies in the lower-panel receiver formed in the middle panel when the extensible cradle tail assumes the contracted state.

16. The juvenile vehicle seat of claim 12, wherein the cradle-cover connector comprises a first strap having an upper end coupled to the cradle cover and a lower end coupled to the wide upper panel.

17. The juvenile vehicle seat of claim 16, wherein the cradle-cover connector further comprises a first female snap coupled to the wide upper panel and a companion first male snap carried on the first strap and removably mated to the first female snap.

18. The juvenile vehicle seat of claim 11, wherein the wide upper panel comprises a front sheet and a rear sheet that is coupled to the front sheet to form a downwardly opening pocket between the front and rear sheets to provide the middle-panel receiver.

19. The juvenile vehicle seat of claim 18, wherein the front and rear sheet cooperate to form a center sleeve and the wide upper panel further comprises a left flap mounted for pivotable movement to a left side of the center sleeve and a right flap mounted for pivotable movement to an opposite right side of the center sleeve to locate the center sleeve between the left and right flaps.

20. The juvenile vehicle seat of claim 19, wherein the extensible cradle tail further includes a cradle-cover connector arranged to connect the cradle cover to the center sleeve of the wide open panel.

21. The juvenile vehicle seat of claim 18, wherein the middle panel is a sleeve that comprises a front sheet and a rear sheet that are joined to one another to form a downwardly opening pocket to provide the lower-panel receiver.

22. The juvenile vehicle seat of claim 11, wherein the middle panel is a sleeve comprising a front sheet and a rear sheet that is coupled to the front sheet to form a downwardly opening pocket between the front and rear sheets to provide the middle-panel receiver.

23. The juvenile vehicle seat comprising
a seat bottom and
a seat back including a backrest arranged to extend upwardly from the seat bottom and a movable headrest including a headrest cradle mounted for up-and-down movement relative to the backrest between a raised position located above the seat bottom and a lower position located between the raised position and the seat bottom, a cradle cover coupled to the headrest cradle, and an extensible cradle tail including a wide upper panel, a middle panel telescopically received in a middle-panel receiver formed in the wide upper panel, a narrow lower panel telescopically received in a lower-panel receiver formed in the middle panel, a cradle-cover connector arranged to interconnecting the cradle cover and the wide upper panel, an elastic upper-panel connector arranged to interconnect the wide upper panel and the middle panel, an elastic lower-panel connector arranged to interconnect the middle panel and the narrow lower panel, and an anchor connector arranged to interconnect the narrow lower panel to a tail anchor that is included in the juvenile vehicle seat and is located in a stationary position alongside the backrest.

24. The juvenile vehicle seat of claim 23, wherein the elastic upper-panel and lower-panel connectors are configured to expand in length during upward movement of the headrest cradle away from the seat bottom to lengthen the extensible headrest tail and to contract in length to shorten the extensible headrest tail as the headrest cradle moves downwardly on the backrest towards the seat bottom, wherein in a contracted state of the extensible cradle tail that is extant when the headrest cradle occupies a lowered position on the backrest, the middle panel is telescopically received in whole or in part in a middle-panel receiver formed in the wide upper panel and the lower panel is telescopically received in whole or in part in a lower-panel receiver formed in the middle panel so as to decrease the effective length of the extensible cradle tail, and wherein in an expanded state of the extensible cradle tail that is extant when the headrest cradle occupies a relatively higher raised position on the backrest, the middle panel is withdrawn in whole or in part from the middle-panel receiver formed in the wide upper panel and the narrow lower panel is withdrawn in whole or in part from the lower-panel receiver formed in the middle panel so as to increase the effective length of the extensible cradle tail.

25. The juvenile vehicle seat of claim 24, further comprising a backrest cover mounted on the backrest and a seat-bottom cover mounted on the seat bottom, the seat-bottom cover includes a seat pad that is arranged to underlie and support a child seated on the seat bottom and the tail anchor, the tail anchor is an anchor panel that is mounted on a rear edge of the seat pad for pivotable movement about a horizontal pivot axis toward and away from the backrest, a rearwardly facing side of the anchor panel engages the front surface of the backrest, an anchor-panel connector is included in the extensible cradle tail to connect the lower end of the narrow lower panel to the anchor panel of the seat-bottom cover to anchor the lower end of the extensible cradle tail to the seat-bottom cover so that the extensible cradle tail can expand and contract in length while allowing up-and-down movement of the headrest cradle that is coupled to the cradle cover relative to the backrest.

\* \* \* \* \*